June 8, 1965 J. W. JENNINGS 3,187,664
AUTOMATIC DEEP-FAT PRESSURE COOKER
Filed Sept. 17, 1962 4 Sheets-Sheet 1

INVENTOR.
JACK W. JENNINGS
BY John H. Widdowson
ATTORNEY

INVENTOR.
JACK W. JENNINGS

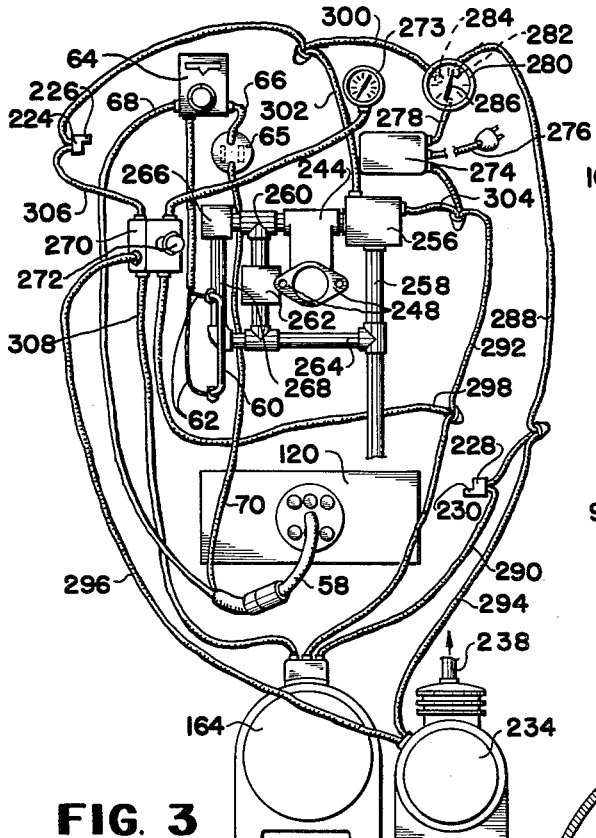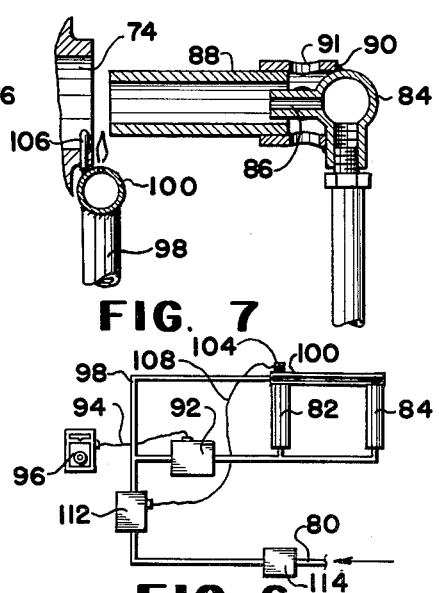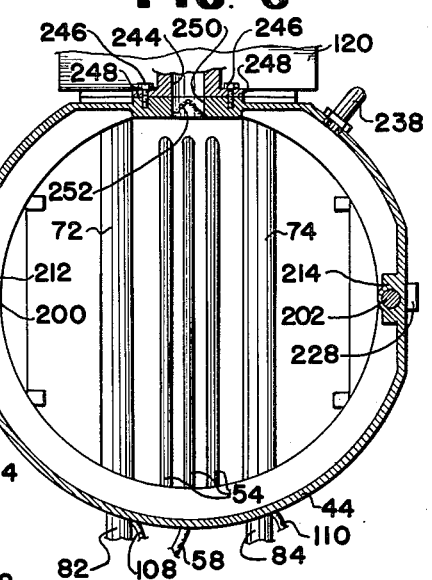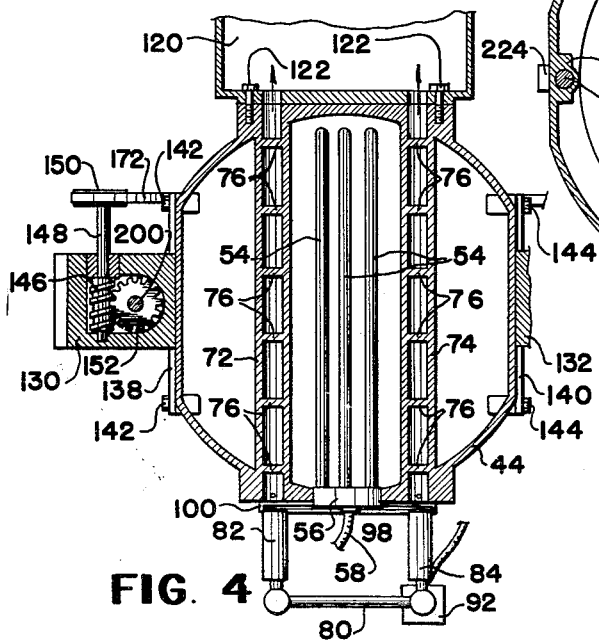

INVENTOR.
JACK W. JENNINGS
BY John H. Widdowson
ATTORNEY

United States Patent Office 3,187,664
Patented June 8, 1965

3,187,664
AUTOMATIC DEEP-FAT PRESSURE COOKER
Jack W. Jennings, 5403 E. Kellogg, Wichita, Kans.
Filed Sept. 17, 1962, Ser. No. 223,935
9 Claims. (Cl. 99—329)

This invention relates to means for cooking food. In a more specific aspect, the invention relates to an automatic deep-fat pressure cooker. In a still more specific aspect, the invention relates to a new pressure cooker having control means therewith to relieve pressure in a food containing portion of the device prior to opening the cover and thereby eliminates substantial danger to the operator thereof.

Various means for cooking are known to the art, including various types of pressure cooking apparatus.

Many of the prior art pressure cooking apparatus require manual operation and must be closely watched to prevent overcooking of food therein. The prior art apparatus do not provide automatic control means having satisfactory safety means therewith to prevent excessive build-up of pressure in the pot during cooking and to automatically relieve pressure in the cooking pot prior to opening the cover means therefor to prevent flash exhausting of pressure and gases from the pot which could cause injury or damage to the operator and surrounding structures. Also, suitable power operated means to control raising and lowering of the cover for the cooking means have not been provided in many prior art devices.

The automatic pressure cooker of the invention overcomes the disadvantages and deficiencies of the prior art devices. The pressure cooker means of the invention have automatic control means whereby pressure built up in the cooking means during operation are automatically relieved prior to opening up the cover means. Also, other safety factors are included to prevent excessive build-up of pressures during the cooking operation. Power means are also preferably provided to raise and lower and operate the apparatus.

The pressure cooker means of the invention includes a hollow pot and heating means operatively connected to the pot to heat same. A cover is movably mounted on the top and connecting means are operatively connected to the cover. Motor means are operatively connected to the connecting means to move same to raise and lower the cover. Vent means are connected in one end portion to the pot and in fluid communication with the interior thereof. Relief valve means are connected to the vent means and are operable when the valve means is open to substantially equalize pressure between the interior of the pot and the atmosphere. The pressure cooker is constructed and adapted to receive and heat a cooking fluid in the pot so that food positioned therein can be cooked under pressure when the cover is closed.

Accordingly, it is an object of the invention to provide new pressure cooker means.

Another object of the invention is to provide a new pressure cooker construction whereby means are provided to relieve pressure in the pot prior to opening same for removal of food therein.

Another object of the invention is to provide a new pressure cooker construction having control means therewith for automatically controlling a cooking cycle.

A further object of the invention is to provide a new automatic pressure cooker having means therewith to relieve pressure in the pot and having power means operable after relief of pressure in the pot to raise and lower the lid or cover for removal of food therein.

A still further object of the invention is to provide power means for a pressure cooker or the like operable to control movement of the cover means for the apparatus during operation thereof.

Various other objects, advantages and features of the invention will become apparent to those skilled in the art from the following discussion taken in connection with the accompanying drawings, in which:

FIG. 3 is a view illustrating the control means of the pressure cooker of FIGS. 1 and 2.

FIG. 4 is a partial transverse cross section view taken along the lines 4—4 of FIGS. 1 and 2.

FIG. 5 is a partial transverse cross section view taken along the line 5—5 of FIG. 2.

FIG. 6 is a diagrammatic view illustrating the preferred system and control means for the gas heating apparatus used with the invention.

FIG. 7 is an enlarged partial cross section view of a portion of the gas heating apparatus.

Figure 1:
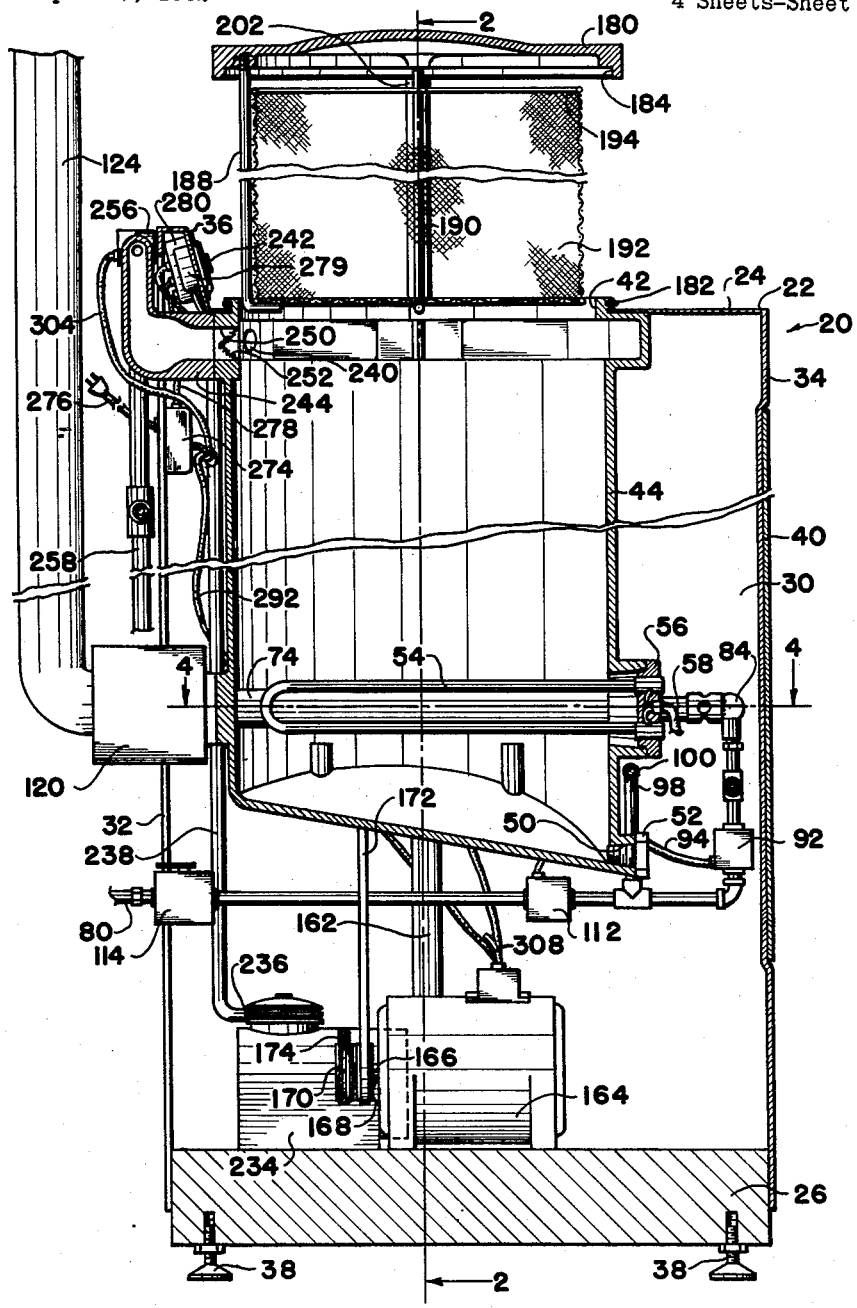
FIG. 1 is a cross section view taken on the line 1—1 of FIG. 2 showing a preferred specific embodiment of the pressure cooker of the invention.

The following is a discussion and description of preferred specific embodiments of the new automatic deep-fat pressure cooker of the invention, such being made with reference to the drawings whereon the same reference numerals are used to indicate the same or similar parts and/or structure. It is to be understood that such discussion and description is not to unduly limit the scope of the invention.

Referring now to the drawings in detail and FIGS. 1–7 in particular where a preferred specific embodiment of the automatic deep-fat pressure cooker of the invention is shown generally at 20 and includes a box-like housing 22 which has a top 24, a bottom 26, two sides 28 and 30, a back 32 and a front 34. Preferably the back has a large opening therein and a portion of the back 32 desirably projects upwardly above top 24 and defines an instrument panel as shown at 36. The bottom 26 has a plurality of legs 38 which are adjustably mounted thereon in any suitable manner, such as by threadedly mounting the legs in tap holes in the bottom 26. By adjusting the legs 38 the housing can be raised and lowered and leveled. Desirably a door 40 is removably mounted on the front 34 of the housing 22 to provide access to the interior of the housing to make adjustments, repairs, etc., on the apparatus therein.

The top 24 of the housing 22 preferably has a large and generally circular opening 42 therein and a hollow pot 44 is located in the housing 22 and has the upper edge portion thereof positioned at the opening 42 in the housing. The top portion of the pot 44 can have a recess therein as shown to receive the edge of the top 24 if desired. The pot 44 preferably has a generally cylindrical center portion and the lower portion thereof is inclined toward the center thereof as shown at 46 and 48 in FIG. 2 and desirably tapers to a threaded drain outlet 50, FIG. 1. A drain plug 52 is threadedly mounted in a drain outlet 50 and is removable therefrom to drain cooking liquids and the like from the pot 44.

Means are provided to heat the pot 44 and a cooking liquid when positioned therein. For this purpose, a plurality of electric heating elements 54 are provided and positioned in the lower portion of the pot 44. The heating elements 54 are desirably elongated and generally U-shaped and the end portions thereof sealingly project through the side of the pot 44. Preferably a collar or mounting plug 56 is provided and has the end portions of the heating elements 54 passing therethrough. The heating elements 54 are connected by a conductor or cable 58 to a suitable source of electric power.

Control means are provided to regulate the operation of the electric heating elements 54 to obtain the desired temperature within the pot 44. For this purpose, a heat sensing element or member 60 is provided and is positioned within the pot 44 and conductors 62 connect the end portions of the member 60 to a common thermostat 64 mounted on instrument panel 36 as shown in FIG. 3. The thermostat 64 is connected by an electrical conductor 66 to a socket or plug 65 which is connectible to a source of electric power of any suitable voltage such as 220 volts and conductor 68 is connected to the thermostat and to the conductor or cable 58. Another conductor 70 is connected to the source of power through the socket or plug 65 and the cable or conductor 58 to thereby provide a complete electrical circuit and control for the heating elements 54.

Gas heating means can be provided in addition to the electrical heating means or as an alternative thereto. The gas heating means preferably includes two elongated gas heating pipes 72 and 74 which have the intermediate portions thereof positioned in the lower portion of the pot 44 adjacent the electrical heating elements 54 when both are provided. The end portions of the gas heating pipes 72 and 74 sealingly project through the pot 44 as best illustrated in FIG. 4. The pipes 72 and 74 desirably have a plurality of baffles 76 therein which extend transversely across the intermediate portions of the pipes and have the lower edges thereof in spaced relation to the lower portion of the pipes and function to impede movement of hot gases therethrough to thereby retain the maximum amount of heat in the pot 44.

A primary gas conduit 80 is connectible in one portion to a supply of combustible fuel gas under pressure, such as common natural gas, propane gas, etc. An intermediate portion of the conduit 80 passes through the housing 22 and desirably through the back 32 thereof as illustrated in FIG. 1 and the other end portion of the conduit 80 is desirably positioned near the inlet ends of the gas heating pipes 72 and 74. Two nozzles 82 and 84 are concerned in one end portion to the gas conduit 80 and have the outlet ends thereof adjacent the inlet ends of the gas heat pipes 72 and 74 as best illustrated in FIG. 7. The nozzles 82 and 84 can be of any suitable construction and preferably have a restricted outlet 86, FIG. 7, opening into a sleeve or tubular portion 88 which is preferably slidably and adjustably mounted in a fixed sleeve 90 to thereby vary the distance between the outermost end of sleeve 88 and the inlet end of the gas heating pipes. Sleeve 90 can have openings 91 therein for admission of air and adjustment of sleeve 88 varies the fuel-air mixture.

A thermostat operated valve 92 is desirably provided in the conduit 80 and connected by a conductor 94 to a common thermostat 96 which can be mounted on the instrument panel 36. If desired and where both gas and electric heating systems are utilized, the thermostats 64 and 96 can be of a single unit. Operation of the thermostat 96 causes valve 92 to be opened and closed in response to the temperature within the pot 44. The thermostat is connected to a suitable heat sending element, such as the element 60, within the pot 44 to operate the thermostat 96 and valve 92 in response to the temperature therein. A pilot light gas conduit 98 is provided and is connected to the primary gas conduit 80 upstream of the valve 92 so that when the valve 92 closes gas to the pilot light conduit 98 is not cut off. An elongated slotted pilot light gas nozzle 100 is connected to the pilot light conduit 98 and in fluid communication therewith to receive gas therefrom. The outlet end of the nozzle 100 is positioned at the inlet ends of the heating pipes 72 and 74 and at the outlet ends of the nozzles 82 and 84 on the primary gas conduit 80 so that when the pilot light is burning gas from the primary gas conduit is ignited as it enters the gas heating pipes 72 and 74.

Means are desirably provided to automatically shut off all gas flowing to the heating apparatus if both the pilot light and the primary gas nozzles become extinguished. For this purpose a thermocouple 104 is provided and mounted adjacent the pilot light, the inlet end of one of the heating pipes 72 and 74 can have the thermocouple 104 mounted thereon in any suitable manner. Thermocouple 104 is connected by conductor 108 to a safety valve 112 in the primary gas conduit 80 upstream of the junction of the primary gas conduit 80 and the pilot light gas conduit 98. The safety valve 112 is operable to be opened as a result of electricity provided thereto by heating of the thermocouple 104 and closed when the thermocouple is cooled. Thus when the flames from the primary gas conduit nozzles 82 and 84 and the pilot light nozzle are extinguished, the safety valve 112 closes and prevents accumulation of gas in and around the apparatus. A main valve 114 is preferably provided upstream of the safety valve 112 so that the entire gas heating apparatus can be manually closed down by the operation of the valve 114.

Means are provided to receive and discharge the fumes or exhaust gases from the gas heating apparatus. For this purpose a flue header 120 is provided and is connected in one end portion to the outer surface of the rear portion of pot 44 in any suitable manner such as mounting bolts 122, FIG. 4. The flue header 120 is positioned on the pot 44 to be in fluid communication with the exhaust end portions of the heater pipes 72 and 74 to receive the exhaust gases therefrom. Preferably a flue 124 is connected in one end portion to the flue header 120 and the other end portion thereof is preferably positioned to exhaust gases to the atmosphere outside the building containing the cooker.

Two gearboxes 130 and 132 are provided and are mounted on the pot 44 on the outer surface and on the lower portion of the pot 44 and are preferably positioned on substantially diametrically opposite portions thereof. The gearboxes 130 and 132 can be mounted in any suitable manner, such as by providing base plates 134 and 136 to receive the gearboxes. Plates 134 and 136 can be secured to flanges 138 and 140, respectively, with the flanges 138 and 140 being connected to the pot 44 by mounting bolts 142 and 144, respectively.

The gear box 130 has a gear 146 rotatably mounted therein with an input shaft 148 projecting through the gearbox 130 and connected to gear 146. A pulley 150 is connected to the outermost end portion of the shaft 148. Another gear 152 is mounted in the gearbox 130 with the axis thereof disposed approximately perpendicular to the axis of the gear 146 and the teeth on the outer surface of the gears 146 and 152 are in meshing engagement so the rotation of shaft 148 imparts a rotation to the gear 152. The gearbox 132 mounts gearing of the same or similar construction to that in box 130 and includes a gear 154 in meshing engagement with a gear 156, the gear 154 being operatively connected to an input shaft having the pulley 158 thereon.

Two guide tubes 160 and 162 are provided and each have the lower end portion thereof fixedly connected to the bottom 26 of the housing 22 in any suitable manner with the upper end portion of the guide tubes 160 and 162 being fixedly connected to the bottom of the gearboxes 130 and 132, respectively. The axis of the guide tubes 160 and 162 are preferably substantially coaxial with the center of the gears 152 and 156.

Power means, preferably a reversible electric motor 164, is provided and is mounted on the bottom 26 of the housing. Motor 164 has a power shaft 166 projecting therefrom which receives and mounts pulleys 168 and 170. A drive belt 172 is connected to the pulley 168 and to the pulley 150 on the input shaft 148 of the gearbox 130 and a similar belt or the like 174 is connected to pulley 170 and pulley 158 of the gearbox 132 so that operation of the motor 164 simultaneously drives the gears in both of the gearboxes.

A cover or lid 180 is provided to enclose the upper portion of the pot 44 and desirably one or more sealing rings 182 are mounted in the upper edge portion of the pot 44 and are engagable by a depending flange 184 on the cover 180 to thereby seal the connection between the cover 180 and the pot 44.

Basket mounting means are preferably provided with the cover 180. The basket mounting means can be provided by three elongated bars 186, 188 and 190 which are desirably of substantially equal length and are each threadedly mounted in one end portion on the inner surface of the cover 180 and are received by the pot 44 when the cover is in the closed position. The bars 186, 188 and 190 are preferably positioned approximately 90 degrees apart and are located in the rear half of the cover 180 with the center one, that is bar 188, being located adjacent the back 32 of the housing 22. The other or lower end portions of the bars 186, 188 and 190 are preferably bent at approximately 90 degrees to the major portion thereof and extend radially inwardly toward the center of the pot 44 when positioned therein.

A basket 192 is provided and is of size and shape to be positioned between the bars 186, 188 and 190 and engagable in the lower portion with the inwardly projecting portion of the bars to thereby mount the basket in place. The basket 192 is provided with a cover 194 which is movable to place food within the basket 192.

Two rods 200 and 202 are each mounted in the upper end portion on the cover 180 by mounting bolts 204 and 206, respectively. Preferably the rods 200 and 202 are positioned at substantially diametrically opposite portions of the cover. The lower end portions of the rods 200 and 202 have continuous helical grooves 208 and 210, respectively, formed therein and the grooved portions of the rods pass through the gearboxes 130 and 132 and gears 152 and 156 therein are in engagement with the grooved surfaces of the rods so that rotation of gears 152 and 156 causes longitudinal movement of the rods and thereby results in raising and lowering of the cover 180. The lower end portions of the rods 200 and 202 project downwardly into the guide tubes 160 and 162, respectively, and are longitudinally movable therethrough. The upper portions of the rods 200 and 202 are desirably smooth as shown and can slidably engage or pass through collars 212 and 214 formed on the outer surface of the upper portion of the pot 44.

Figure 2:
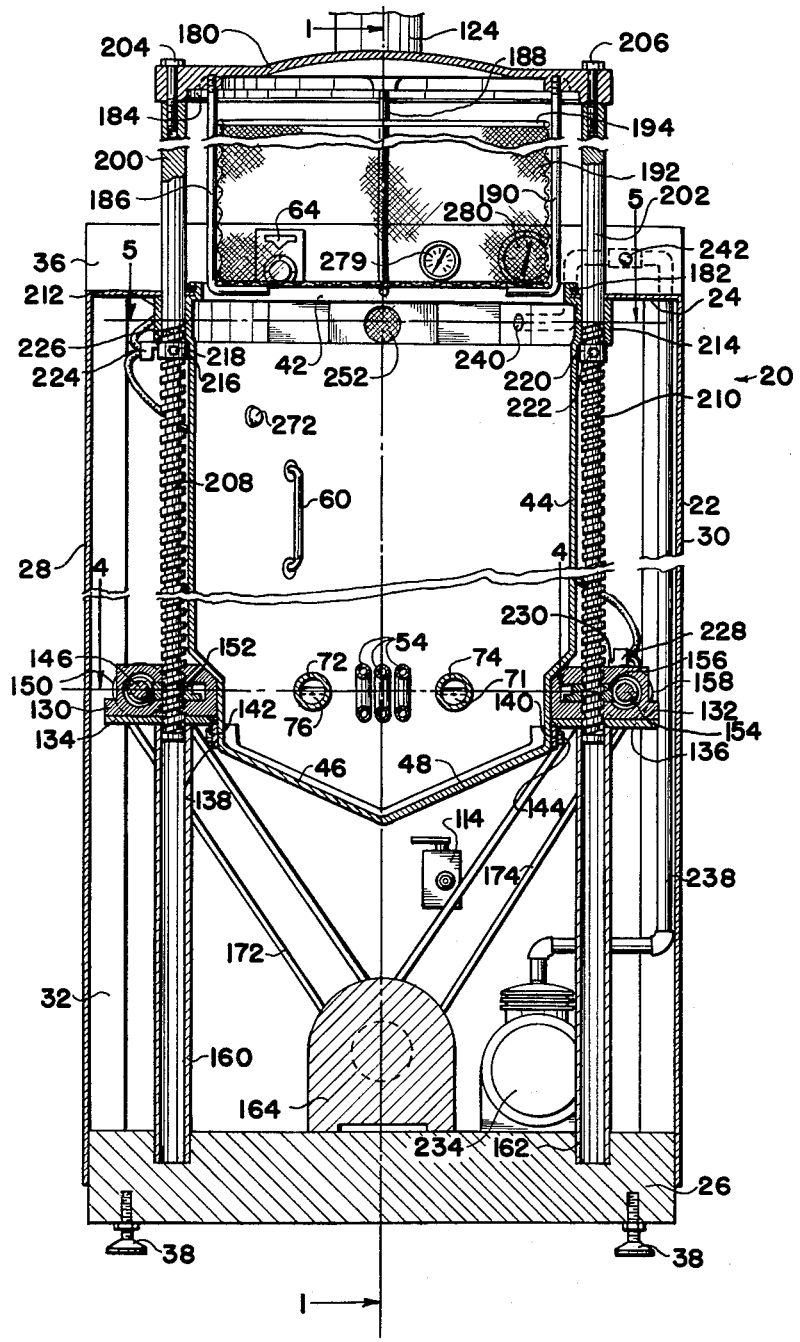
FIG. 2 is a cross section view taken on the line 2—2 of FIG. 1.

A collar 216 is preferably provided and mounted on rod 200 at the threaded or grooved portion thereof and can be secured in place by a set screw 218, the collar being adjustable along the rod 200 to the desired position and held in place by the set screw 218. Another collar 220 is mounted on the grooved portion of the rod 202 and is held in the desired place by a set screw 222. As indicated in FIG. 2 the collars 216 and 220 are positioned between the gearboxes 130 and 132 and the cover 180 and are desirably between the gearboxes and the sleeves 212 and 214. The collars 216 and 220 form abutments or the like and are engageable with suitable switch means to perform limiting operations.

A microswitch 224 is mounted on the pot 44 or the housing and has a switch operator 226 projecting therefrom and positioned to be engaged by the collar 216 upon movement of same. The microswitch 224 is preferably of a common construction wherein engagement of the collar 216 with the switch operator 226 opens the switch. Another microswitch 228 of the same or similar construction is provided and has the switch operator 230 thereof positioned to be engaged by the collar 220. Preferably switch 228 is mounted on the gearbox 132. The microswitches 224 and 228 are preferably electrically connected to the motor 164 in the manner explained hereinafter so that engagement of the switch operators of the microswitches by the collars 216 and 220 opens the circuit to the motor to stop operation of same. By proper adjustment of the collars and/or the microswitches the motor 164 can be stopped and started to raise and lower the lid 180 and obtain the desired extent of movement of the lid.

An air compressor 234 of any suitable construction is provided and is mounted on the bottom 26 of the housing 22 and the outlet 236 of compressor 234 is connected to one end portion of an air conduit or pipe 238. The other end portion of the air conduit 238 is connected to the upper portion of the pot 44 and is in fluid communication with the interior thereof through the aperture or opening 240. A valve 242 is preferably provided in conduit 238 and is desirably of the manually operated type and is normally in the open position when using the automatic operation of the apparatus as described hereinafter. The operator of valve 242 is desirably located on the instrument panel 236 as best illustrated in FIG. 2.

Means are preferably provided to reduce pressure in the pot 44 to substantially atmospheric pressure prior to opening of the lid or cover 180. Preferably a generally L-shaped vent 244 is provided and is connected in the lower end portion to the upper portion of the rear portion of the pot 44 by bolts or the like 246 which pass through apertures in projecting ear portions 248 of the vent as best shown in FIG. 5. The vent 244 desirably communicates with the interior of the pot 44 through an aperture or opening 250 and preferably a screen 252 is mounted in the aperture or opening 250 to prevent discharge of solid or semi-solid food particles, etc. through the hole 250.

The end portion of the vent 244 opposite from the mounting ears 248 is desirably positioned above the hole 250 as best illustrated in FIGS. 1 and 3 and has two outlet openings at the sides thereof. A magnetic relief valve 256 has the inlet end thereof operatively connected to one of the outlet openings of the vent 244 and the outlet of the valve 256 is connected to one end of an exhaust pipe 258, the other end of the pipe 258 being connected to a sewer pipe, etc. (not shown). Thus, when the magnetic relief valve 256 is opened, exhaust gases from within the pot 44 will pass through opening or hole 250 therein into the vent 244 and through the valve 256 and pipe 256 and pipe 258 to the atmosphere.

Safety or regulator valve means are desirably provided to prevent undesirable increase of pressure within the pot 44 to such an extent that operation of the apparatus may become dangerous. Preferably safety or regulator valve means are provided and mounted as shown and described herein whereby a T-shaped coupling 260 having three openings has one of the openings connected to the other opening of the upper end portion of the vent 244 and has another opening operatively connected to a safety or regulator valve 262 and a pipe 264 connects the outlet of the valve 262 to the exhaust pipe 258 so that when safety valve 262 opens pressure and gases from within the pot 44 are discharged through vent 244, coupling 260 and valve 262 to the pipe 258 and to the atmosphere. Desirably valve 262 opens at approximately the desired maximum operating pressure, such as 20 pounds per square inch of pressure.

Preferably another safety or regulator valve 266 is provided and is operatively connected to the other outlet of the T-shaped coupling 260 with the outlet of valve 266 being connected by a pipe 268 to the pipe 264 to direct exhaust gases therethrough to the exhaust pipe 258 and to the atmosphere. Preferably valve 266 is constructed and operable to open above normal maximum operating pressures, for example, at approximately 30 pounds per square inch pressure where normal pressure is 20 pounds per square inch, and by providing two separate valves 262 and 266 operable to open at different pressures, malfunction of one of the valves will not prevent relief of pressure in the pot 44 before such rises to a dangerous level.

A pressure operated switch 270 is mounted on the pot 44 and has a pressure sensing portion 272 positioned within the pot with the pressure sensing portion fluctuating with pressure in the pot to open and close two separate sets of electrical contacts within the switch 270. Preferably switch 270 is constructed so that the contacts therein are closed at atmospheric pressure and open when pressure in the pot reaches normal operating pressure of approximately 18–20 pounds per square inch. A pressure gauge 273 can be provided with switch 270 and mounted on the instrument panel 36 to determine pressure in pot 44.

The apparatus of the invention is desirably electrically controlled and an electrical inlet socket or distribution member 274 is connected by a cord 276 to a source of electric power and the hot wire from socket 274 is shown at 278 and leads to a timing switch 280 mounted on the instrument panel 36 of the housing. The timer switch 280 has two fixed electrical contacts 282 and 284 and a clock operated movable contact 286 which is electrically engageable with the fixed contacts 282 and 284 and is electrically connected through wire 278 to the socket 274 to receive electricity therefrom and functions to switch the apparatus. The fixed contact 282 of switch 280 is connected in series by a conductor 288 to the microswitch 228 and by conductor 290 to one side of electric motor 164 and by conductor 292 to the return or ground of the socket 274. Thus, when the movable contact 286 is in electrical contact with the fixed contact 282 electric current is provided to the motor 164 through switch 228 when closed to provide electric current to operate the motor and cause lowering of the cover 180 until the switch 228 is opened to stop the motor at which time the cover is in the lowermost or closed position.

Another conductor 294 is connected to an intermediate portion of conductor 288 and to the compressor 234. Conductor 296 is also connected to the compressor 234 and to one side of one of the contacts in the pressure operated switch 270 with the other side of one set of contacts in switch 270 being connected by conductor 298 to an intermediate portion of the conductor 292 to thereby provide an electric circuit in parallel with the circuit to the motor so that the compressor 234 is operated as the cover is in the lowermost position until such time as the pressure operated switch is opened by pressure within the pot 44.

The other of the fixed contacts 284 of the timer switch 280 is connected by conductors 300 and 302 to the magnetic relief valve 256 and valve 256 is connected by conductor 304 to an intermediate portion of conductor 292 to complete the circuit to socket 274. The conductor 300 is also connected to one side of the microswitch 224 and the other side of the microswitch is connected by conductor 306 to one side of the other set of electrical contacts in pressure operated switch 270 with the other side of the other set of contacts therein being connected by conductor 308 to the electric motor 164 and through conductor 292 to the socket 274 to thereby complete a circuit in parallel with the magnetic relief valve circuit. When the magnetic relief valve is operated to relieve pressure in the pot the pressure operated switch 270 closes at approximately atmospheric pressure in pot 44 to provide electric current to the motor 164 to operate same to raise the cover 180. As motor 164 raises lid or cover 180 to its uppermost position the switch operator 226 of the microswitch 224 is engaged by the collar 216 to open the switch 224 and stop the motor.

In operation, the pot 44 is provided with a cooking material, such as an oil or liquid or a semi-solid material of paste-like consistency which is liquefied upon heating to provide a cooking liquid, and such is heated by the gas heating pipes 72 and 74 and/or the electric heating elements 54 positioned within the pot 44. Food or the like is then placed within the basket 192 and such is mounted on the basket mounting means 186, 188 and 190. The movable contact 286 of timer switch 280 is then moved into engagement with the fixed contact 282 to thereby provide electric current to the motor 164 to operate same to provide power to the gears in the gear boxes 130 and 132 and thereby move the rods 200 and 202 to lower the cover 180. When cover 180 reaches its lowermost position collar 220 on rod 202 simultaneously engages the switch operator 230 of microswitch 228 to open the circuit to the electric motor 164 to stop same. The cover 180 is then in sealing engagement with the seal 182 on the top portion of the pot 44. Current is simultaneously supplied to compressor 234 which provides air under pressure through conduit 238 to the pot 44 until the desired pressure is reached therein, preferably the pot 44 being pressurized to approximately 18 pounds per square inch, at which time the pressure operated switch 270 opens to stop compressor 234. The food in basket 192 continues to cook while immersed in the cooking liquid and the operation of timing switch 280 gradually moves the movable contact 286 into contact with the fixed contact 284. When current is supplied to fixed contact 284 the magnetic relief valve 256 is opened to exhaust gases within pot 44 through the vent 244 and exhaust pipe 258 to the atmosphere until pressure in the pot reaches substantially atmospheric pressure. When pressure in the pot 44 returns substantially to atmospheric pressure, the pressure operated switch 270 closes to provide electric current through conductor 300 and conductor 308 to the electric motor 164 to operate the motor in the opposite direction and transmit power through the gears in the gearboxes to raise the cover 180. When the cover 180 reaches its uppermost position the collar 216 on rod 200 engages switch operator 226 of microswitch 224 to open the switch and thus tsop motor 164. The basket 192 can then be removed and the food therein removed from the basket.

During cooking operations and when the cover 180 is closed, the regulator or safety valves 262 and 266 function to maintain pressure within the pot 44 at the desired pressure. Normally valve 262 operates to maintain pressure within the pot at approximately 20 pounds per square inch, however, if the valve 262 does not function, then valve 266 opens to prevent pressure in the pot from increasing above 30 pounds per square inch. This is a desirable safety feature and operation of these two valves substantially eliminates any possibility of excessive pressure being created in the pot 44.

Figures 8, 9, 10:
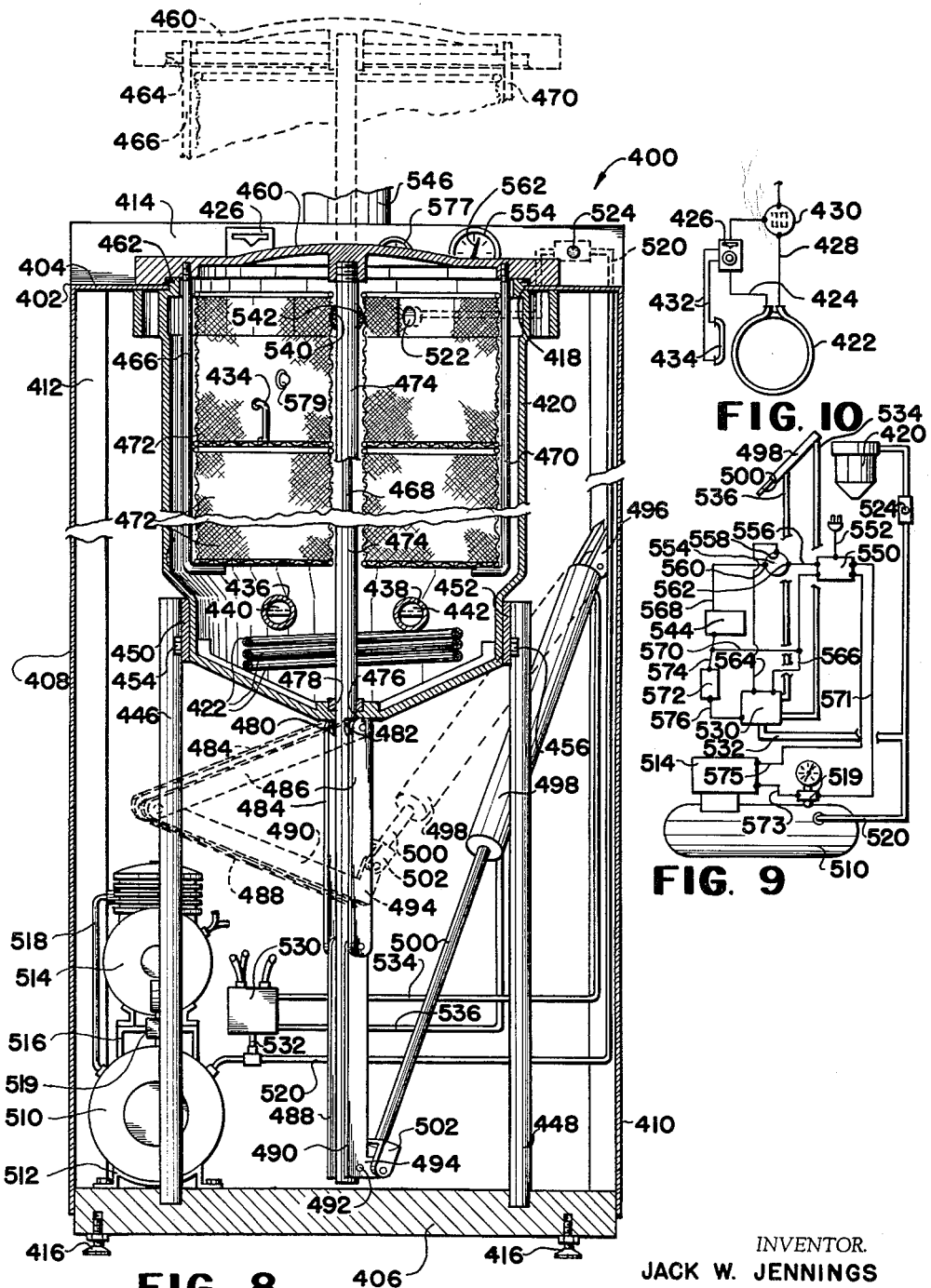
FIG. 8 is a cross section view illustrating another preferred specific embodiment of the automatic deep-fat pressure cooker of the invention.
FIG. 9 is a diagrammatic view illustrating control and operating apparatus for the embodiment of the invention of FIG. 8.
FIG. 10 is a diagrammatic view of the preferred electrical heating apparatus and controls therefor used with the invention.

Another preferred specific embodiment of the automatic deep-fat pressure cooker of the invention is shown generally at 400 in FIGS. 8–10 and preferably includes a box-like housing shown generally at 402 which has a top 404, a bottom 406, two sides 408 and 410, a front (not shown) and a back 412 which has a large opening therein. Preferably a portion of the back 412 projects above the top 404 and extends entirely across the housing 402 to provide an instrument panel as shown at 414. A plurality of legs 416 are adjustably mounted on the bottom 406 to raise and lower the housing and level same. The housing 402 is substantially the same or similar in construction to the housing 22 of the previously described embodiment and desirably has a movable door on the front thereof to provide access to the interior of the housing.

The top 404 of the housing 402 preferably has an opening 418 therein which is generally circular and a hollow pot 420 is positioned within the housing with the upper edge portion thereof positioned at the opening 418 in top 404. The construction and mounting of the pot 420 is substantially the same as that shown at 44 in the previously described embodiment. Pot 420 is inclined at the lower portion and is generally cylindrical in the intermediate portion in the preferred embodiment illustrated.

A plurality of electrical heating elements 422 are positioned within the lower portion of the pot 420 with the end portions thereof sealingly projecting through the pot in the manner of the heating elements 54. As illustrated in FIG. 10, the heating elements 422 are connected by conductor 424 to a thermostat 426 mounted on the instrument panel 414 and by a conductor 428 to a plug or receptacle 430 which is connectible to a source of power, preferably a 220 volt power source. Thermostat 426 is connected by conductors 432 to a heat sensing element 434 which is positioned within the pot 420 and operation of thermostat 426 controls the amount of power supplied to the heating elements 422 to thereby regulate the heat of a cooking fluid within the pot 420.

Gas heating pipes 436 and 438 are provided and positioned within the pot 420 and preferably have baffles 440 and 442 therein. The construction, mounting and operation of the heating pipes 436 and 438 and gas supply means therefor is desirably the same or similar to that described hereinbefore in connection with FIGS. 1–7.

Two pot support tubes 446 and 448 are preferably provided and have the lower end portion thereof connected to the bottom of the housing 402 in any suitable manner. The upper portions of the tubes 446 and 448 are connected to the pot 420 in any suitable manner, such as by welding or otherwise fastening the tubes to mounting plates 450 and 452, respectively, which are secured to the pot 420 by mounting bolts 454 and 456, respectively.

A generally circular cover or lid 460 is provided and is of size to enclose the upper portion of the pot 420 when in the lowermost position. Preferably, the pot 420 has a seal 462 which is engaged by the surface 464 of cover 460 when the cover is in the lowermost position to thereby sealingly connect the cover to the pot.

Three elongated bars 466, 468 and 470 are provided and each threadedly mounted in one end portion on the inner surface of the cover 460 and located to be received by the pot 420 when the cover is in the closed position. The bars are positioned approximately 90 degrees apart and located in the rear half of the cover with the center bar 468 being located adjacent the back of the housing. The lower end portion of each of the bars is preferably bent radially inwardly toward the center of the pot. A plurality of baskets 472 for food and the like are preferably provided and are desirably mounted one on top of the other and positioned on the bars 466, 468 and 470.

A rod 474 is mounted in one end portion on the center portion of the cover 460 in any suitable manner such as by threadedly mounting the rod thereon as shown. The other end portion of rod 474 projects through the bottom of the pot 420 and is slidable therethrough. A hole or opening 476 is provided in the pot 420 to receive the lower end portion of rod 474 and a sealing member 478 is preferably located in the upper portion of the hole 476 and slidably and sealingly engages the outer surface of the rod 474 to thereby seal the connection therebetween the prevent leakage of cooking fluids through the hole 476 to the pot.

Two spaced mounting flanges 480 and 482 are provided on the bottom of the pot 420 on opposite sides of the hole or opening 476 therethrough and are out of the interfering way of the rod 474. A first pair of operating arms 484 and 486 are pivotally mounted in one end portion on the mounting flanges 480 and 482, respectively, and are positioned on opposite sides of the rod 474. Another pair of operating arms 488 and 490 are positioned on opposite sides of the rod 474 and the arms 488 and 490 are pivotally connected in the one end portion to the lower end portions of the arms 484 and 486, respectively. The other or lower end portions of the arms 488 and 490 are each pivotally connected to the lower end portion of rod 474 by a pivot pin 492 passing through the arms and the rod. Arm 490 has an integrally formed projecting flange or mounting portion 494 at the end portion thereof opposite from the arm 486 which is generally perpendicular to the main portion of the arm 490. Arm 488 has a similarly constructed projecting mounting portion (not shown).

A mounting bracket 496 is preferably provided and connected to side 410 of the housing 402 adjacent the back 412 thereof and is desirably located between the bottom 406 and top 404. A common air cylinder 498 is provided and is pivotally mounted in the head end portion on the bracket 496 and has a piston rod 500 projecting from the rod end portion thereof. A bracket 502 is connected to the outermost end portion of the piston rod 500 and is pivotally connected to the mounting portions of the operating arms 488 and 490. As the piston rod 500 is extended and retracted relative to the air cylinder 498, the arms 484, 486 and 488 and 490 are moved from the position shown in the solid lines in FIG. 8 to the position shown in the dotted lines, that is from a generally longitudinally aligned position to a position at an angle to each other, and this movement of the arms causes movement of the rod 474 connected to the arms 490 and 488 to thereby raise and lower the cover 460 relative to the pot 420. By providing the projecting mounting portions as shown at 494 for arm 490 leverage is obtained for initiating movement from a longitudinally aligned position upon initial retraction of piston rod 500. Also, as piston rod 500 is extended to its outermost position this leverage moves the operating arms to a past center relation to thereby lock the rod 474 in the lowermost position. The mounting of the air cylinder and length of the operating arms is such that as the piston 500 reaches the extreme limits of its positions, the cover 460 also reaches its open and closed positions.

Means are provided to furnish air under pressure to the cylinder 498 and to the pot 420. Preferably the air under pressure is provided by an air storage tank 510 which is preferably operatively connected to bottom 406 of the housing in any suitable manner such as by a mounting bracket 512 which holds the tank 510 and is secured to the bottom 406. An air compressor is preferably provided and positioned within housing 402 and desirably the compressor 514 is mounted on top of the air tank 510 by a mounting bracket 516 to thereby use a minimum of space on the bottom 406 of the housing. An air conduit 518 is connected in its end portions to the air outlet of the compressor 514 and to the inlet of the storage tank 510 to provide air under pressure from the air compressor to the air storage tank. If desired, pressure regulator means 519 can be provided and connected to the air storage tank and the compressor to shut off the compressor when air in the tank 510 reaches a predetermined pressure.

An air hose or conduit 520 is connected in its end portions to the outlet of the air storage tank 510 and to an aperture or opening 522 in the pot 420 to provide air under pressure thereto. Desirably a manually operated valve 524 is provided in conduit 520 and mounted on instrument panel 414 so that the valve 524 can be opened when air under pressure is desired in the tank 420. If desired, automatic pressure regulator means as shown and described in connection with FIGS. 1–7 can be used in this embodiment also.

An electrically operated four-way air valve 530 is provided and has the inlet therein operatively connected to the air storage tank in any suitable manner such as by an air conduit or hose 532 connected to the valve 530 and to the conduit 520. A hose or conduit 534 is connected to one outlet of the air valve 530 and is connected in the other end portion to the head end portion of the air cylinder 498. Another hose or conduit 536 is connected to another outlet of the air valve 530 and to the rod end portion of the air cylinder 498 to provide air under pressure thereto. Hoses or conduits 534 and 536 are preferably flexible to be moved with the cylinder 498 in operation. The other outlet of the four-way valve 530 desirably opens to the atmosphere to exhaust air therefrom. Air is exhausted to the atmosphere from valve 530 which is received from the air cylinder 498 and forced therefrom by operation of the piston rod 500.

The pot 420 has an opening 540 in the upper portion thereof and a screen 542 is preferably positioned in opening 540 to prevent passage of food particles therethrough. The hole 540 is in fluid communication with a vent (not shown) which is of the same or similar construction to the vent 244 previously described and which is desirably L-shaped. A magnetic relief valve shown diagrammatically at 544 in FIG. 9 is connected to the vent in the same or similar manner as the magnetic relief valve 256 previously described and is operable when opened to discharge gases from pot 420 to lower pressure to substantially atmospheric pressure. Gases from pot 420 are exhausted to the atmosphere in the manner previously described. Suitable regulator or safety valve means are also preferably provided with the pressure cooker 400 and such are desirably the same or similar in construction and operation to those shown at 262 and 266 of FIGS. 1–7.

An electrical inlet socket 550 is connected to a source of electric power by a cord of conductor 552 and a timer switch 554 is mounted on the instrument panel 414 and is electrically connected to socket 520 by a conductor 556. The timer switch 554 has two fixed contacts 558 and 560 and a clock operated movable contact 562. The fixed contact 558 of switch 554 is connected to the four-way air valve 530 by a conductor 564 and another conductor 566 is connected to the air valve 530 and to the inlet socket 550 to complete an electrical circuit so that when movable contact 562 of switch 554 is in engagement with the fixed contact 558 electricity is supplied to the air valve 530 to operate same and provide air through the valve and through conduit or hose 534 to the air cylinder 498 to thereby extend piston rod 500 and lower the cover or lid 460.

The fixed contact 560 of timer switch 554 is connected in series to magnetic relief valve 544 by a conductor 568 and the circuit is completed by a conductor 570 which is electrically connected to the magnetic relief valve 544 and to the conductor 566 leading to the socket 550. Thus, when movable contact 562 of the timer switch 554 is placed in electrical engagement with the fixed contact 560 current is supplied to magnetic relief valve 544 to operate same and open the valve to thereby discharge gases from within the pot 420 to the atmosphere and reduce pressure therein to substantially atmospheric pressure.

Means are preferably provided to prevent raising of the cover until a sufficient time interval after opening of the magnetic relief valve 544 so that the pressure within the pot 420 is substantially at atmospheric pressure before the cover is raised. For this purpose, a time delay relay switch 572 is provided and is connected by conductor 574 to the outlet of the magnetic valve 544 to receive current therefrom and a conductor 576 connects the outlet contact of the relay 572 to the electrically operated air valve 530 with conductor 566 completing the circuit to the socket 550. Thus, the time delay relay switch 572 operates to delay flow of electric current to the air operated valve 530 after operation of the magnetic valve 544 so that pressure within the pot is substantially at atmospheric pressure before current is supplied through conductor 576 to the four-way air valve to cause operation of the valve to provide air therefrom through conduit or hose 536 to the lower or rod end portion of the cylinder 498 and retract the piston rod 500 and move the operating arms to raise the cover 460.

Preferably electric current for operating compressor 514 is received from socket 550 through conductor 571 connected to the socket 550 and the regulator 519 and through conductor 573 connected to the regulator and the compressor. The circuit is completed by a conductor 575 connected to compressor 514 and the socket 550.

In operation a cooking liquid or semi-solid fat material is placed in the pot 420 and is heated by operation of the electrical heating elements 422 or the gas heating pipes 436 and 438 or a combination of these heating means to raise the temperature of the cooking material to the desired temperature. Food or the like is then placed within one or both of the baskets 472 and the baskets are mounted on the rods or bars 466, 468 and 470 and the timer switch 554 is set with the movable contact 562 in electrical contact with the fixed contact 558. This provides electric current to the electrically operated four-way valve 530 to switch same and provide air under pressure from the compressor 514 and air storage tank 510 through the valve 514 and hose or conduit 534 to the head end portion of the cylinder 498 to thereby extend the piston rod 500 and lower the cover 460 until it is in sealing engagement with the upper portion of the pot. When the cover is in its lowermost or sealed engagement with the pot, the valve 524 in hose or conduit 520 can be opened to provide air under pressure to the pot 420 and is closed when the air within the pot reaches the desired pressure level, the pressure being indicated on the gauge 577 mounted on the instrument panel 414 and operatively connected to the pressure sensing element 579 in pot 420.

The food cooks within the pot until the movable contact 562 of the timer switch 558 comes into electrical contact with the fixed contact 560 thereof to provide electric current through conductor 568 to magnetic operated valve 544 to operate same to open the valve and exhaust gas from the pot 420 through hole or opening 540 therein to the atmosphere to thereby lower pressure in the pot 420 to approximately atmospheric pressure. After a predetermined time interval the time delay relay switch 572 closes to provide electric current through valve 544 and relay 572 to the electrically operated four-way valve 530 to switch same to provide air under pressure to hose or conduit 536 and to the rod end portion of the air cylinder 498 to retract the piston rod 500 therein and thereby cause the cover 460 to be raised and remove the baskets 472 containing the food from the cooking fluid.

During operation of both embodiments of the invention the cooking fluid is preferably heated to a temperature of approximately 350° F. and the tank 420 is maintained at a pressure of approximately 18 to 20 pounds per square inch. These temperatures and pressures have been found desirably in practice and can be varied for the type of food being cooked, the length of time for cooking, etc. Also, the time which the food is cooked is variable. For example, in cooking thighs and other relatively thick portions of chicken approximately six to six and one-half minutes at a cooking temperature of approximately 350° F. and 18 to 20 pounds per square inch pressure has been found satisfactory. Under the same temperature and pressure conditions approximately four to four and one-half minutes is required for cooking drumsticks, wings and other relatively thin or less meaty portions of the chicken.

While the invention has been described in connection with preferred specific embodiments thereof, it will be understood by those skilled in the art that such is intended to illustrate and not to limit the scope of the invention which is defined by the claims.

I claim:

1. An automatic deep fat pressure cooker comprising, in combination, a housing having a portion defining an instrument panel, said housing having an opening in the top, a hollow pot positioned in said housing and having the upper edge portion thereof positioned at said opening in said housing, said pot having a generally cylindrical center portion and an inclined lower portion tapering to a drain outlet at the lowermost portion of the interior of said pot, a plurality of electrical heating elements positioned in said lower portion of said pot and having end portions thereof sealingly projecting through said pot, each of said heating elements being electrically connected to a thermostat and to a source of electric power, a heat sensing member electrically connected to said thermostat and positioned within said pot to sense the temperature therein to operate said thermostat, two elongated gas heating pipes having intermediate portions thereof positioned in said lower portion of said pot adjacent said electric heating elements and having the end portions thereof sealingly projecting through said pot, each of said pipes having a plurality of baffles therein extending transversely across said intermediate portions thereof, a primary fuel gas conduit connectible in one end portion to a supply of combustible fuel gas under pressure, two nozzles connected to said gas conduit, each of said nozzles being positioned adjacent and in spaced relation to said inlet ends of said heating pipes, a thermostat operated valve in said gas conduit upstream from said nozzles and operable to open and close said conduit to the passage of gas in response to the temperature in said pot, a pilot light gas conduit connected to said primary gas conduit upstream of said valve therein, a pilot light nozzle connected to said pilot light conduit and positioned at said inlet ends of said heating pipes between said first-named nozzles and said heating pipes, said pilot light nozzle operable when lit to ignite gas from said first-named nozzles, a thermocouple, said inlet end of one of said heating pipes having said thermocouple mounted thereon adjacent said pilot light nozzle, a safety valve in said primary gas conduit upstream of said pilot light conduit, said safety valve being operatively connected to said thermocouple and operable to close said primary conduit when said thermocouple is cooled as a result of extinguishing the flames of said first-named nozzles and said pilot light nozzle at said inlet ends of said heating pipes, a flue header connected in one end portion to the outer surface of the rear portion of said pot and positioned in fluid communication to the exhaust end portion of both of said heater pipes to receive exhaust gases therefrom, two gear boxes mounted on the outer surface of said lower portion of said pot and positioned at substantially diametrically opposite portions thereof, each of said gear boxes having gears mounted therein and an input shaft connected to said gears and projecting from said gear boxes, two guide tubes each having the lower end portion thereof fixedly connected to said bottom of said housing and each having the upper end portion thereof connected to the bottom of said gear boxes, a reversible electric motor, two drive belts connected to said motor and operatively connected to said input shafts of said gears in said gear boxes to drive same, a cover for said pot, three elongated bars each mounted in one end portion on the inner surface of said cover and received by said pot when said cover is in the closed position, said bars being positioned approximately 90° apart and located in the rear half of said cover with the center one thereof being located adjacent said back of said housing, the other end portion of each of said bars being bent radially inwardly toward the center of said pot, a basket for food and the like positioned on said other end portions of said bars, an annular sealing ring mounted on said upper edge portion of said pot and positioned thereon to sealingly engage said cover when in the lowermost position, two rods, each of said rods being mounted in one end portion on said cover at substantially diametrically opposite portions thereof, the other end portions of each of said rods having a continuous helical groove therein, said other end portions of said rods passing through said gear boxes into said guide tubes with said gears in said gear boxes operatively connected to said rods so that operation of said motor causes movement of said gears to raise and lower said rods and said cover, two collars, each of said rods having one of said collars adjustably mounted thereon and positioned between said gear boxes and said cover, two micro-switches electrically connected to said motor to stop same, one of said switches being mounted on said upper edge of said pot with the switch operator thereof positioned to be engaged by one of said collars when said cover is at its uppermost position to open said switch and stop said motor, the other of said switches being mounted on one of said gear boxes and having the switch operator thereof positioned to be engaged by the other of said collars when said cover is at the lowermost position to open said switch and stop said motor, an air compressor, an air conduit connected in the end portions to the air outlet of said compressor and to said upper portions of said pot to pressurize said pot when said cover is closed and said compressor is operating, a valve in said air conduit operable to open and close said conduit to the passage of air, a vent connected in one end portion to said upper portion of said rear portion of said pot and in fluid communication with the interior of said pot, said vent having two outlet openings at the other end portion thereof, a magnetic relief valve operatively connected to one of said outlet openings of said vent, an exhaust pipe connected in one end portion to said magnetic relief valve with the other end portion opening to the atmosphere with gases from said pot being discharged through said vent and said exhaust pipe to the atmosphere when said relief valve is open, a T-shaped coupling having three openings with one of said openings being operatively connected to the other of said openings at said other end portion of said vent, a safety valve operatively connected to another opening of said coupling and operable to open at approximately 20 pounds per square inch pressure to pass gases from said pot therethrough, a pipe connected in the end portions to said last-named safety valve and to an intermediate portion of said exhaust pipe, another safety valve connected to the other opening of said coupling and operable to open at approximately 30 pounds per square inch pressure to pass gases from said pot therethrough, another pipe connected in the end portions to said last-named safety valve and to an intermediate portion of said last-named pipe, a pressure operated switch mounted on said pot and having a pressure sensing portion positioned in said pot, said pressure operated switch having two separate sets of electrical contacts therein movable by said pressure sensing portion in response to the pressure in said pot from a closed position at substantially atmospheric pressure to an open position at approximately 18 pounds per square inch pressure, an electrical inlet socket connectible to a source of electric power, a timer switch mounted on said instrument panel and electrically connected to said inlet socket to receive electricity therefrom, said timer switch having two fixed electric contacts and a clock operated movable contact electrically engageable with said fixed contacts to provide electricity thereto, one of said fixed contacts of said timer switch being electrically connected in series to said other of said micro switches, said electric motor and said inlet socket to complete an electrical circuit and provide current to said motor to cause lowering of said cover when said other of said micro switches is closed, a second electric circuit in parallel to said last-named circuit connecting said one of said fixed contacts of said timer switch in series with said compressor and one of said sets of electric contacts in said pressure operated switch and said inlet socket to cause operation of said compressor until pressure in said pot reaches approximately 18 pounds per square inch to open said pressure operated switch, the other of said fixed contacts of said timer switch being electrically connected in series to said magnetic relief valve and to said inlet socket to complete a third electrical circuit and open said magnetic relief valve and exhaust gases from said pot to reduce pressure therein, a fourth electric circuit in parallel to said third electrical circuit connecting in series said other of said fixed contacts of said timer switch, said one of said micro switches, the other set of contacts in said pressure operated switch, said electric motor and said inlet socket to operate said motor to raise said cover when said one of said micro switches and said other set of contacts in said pressure operated switch are closed, said pressure cooker being constructed and adapted to receive a cooking liquid in said pot with such being heated by said electric heating elements and said heating pipes in said pot, foot or the like received in said basket being lowered into said cooking liquid as said cover is lowered by said motor when said movable contact and said one of said fixed contacts of said timer switch are in electrical contact and while said other of said micro switches is closed, said compressor being operated to pressurize said pot to approximately 18 pounds per square inch with the pressure in said pot opening said contacts in said pressure operated switch to stop said compressor, said movable contact of said timer switch being moved after a preset time interval into electrical contact with said other of said fixed contacts to open said magnetic relief valve and exhaust gases from said pot through said vent and said exhaust pipe to the atmosphere, said contacts in said pressure operated switch being closed when pressure in said pot returns to substantially atmospheric pressure to permit passage of electric current from said other of said fixed contacts through said one of said micro switches and said pressure operated switch to said electric motor to operate same to raise said cover and said basket carried by said cover until said one of said micro switches is opened.

2. An automatic pressure cooker comprising, in combination, a housing, a hollow pot positioned in said housing and having the upper edge portion thereof projecting through the top of said housing, electrical heating means positioned within said pot and operatively connected to a source of electric power to in operation heat a cooking fluid in said pot, gas heating pipes positioned within said pot, gas burner nozzles at the inlet end of said pipes to burn a fuel therein, two gear boxes mounted on the outer surface of said pot and having gears mounted therein with the input shafts thereof projecting from said gear boxes, two guide tubes each having the lower end portion thereof fixedly connected to said bottom of said housing with the upper end portions thereof connected to the bottom of said gear boxes, a reversible electric motor, connecting means connected to said motor and operably connected to said input shafts of said gears in said gear boxes to drive same upon operation of said motor, a cover for said pot, basket support means mounted on said cover and positioned within said pot when said cover is in a closed position, a basket for food and the like positioned on said basket mounting means, two rods, each of said rods being mounted in one end portion on said cover and having a continuous helical groove therein in the other end portion thereof, and said other end portions of said rods passing through said gear boxes into said guide tubes with said gears in said gear box being operatively connected to said grooves in said rods so that operation of said motor causes movement of said gears to raise and lower said rods and said cover, switch operator means mounted on at least one of said rods between said gear boxes and said cover, two micro-switches electrically connected to said motor and operable to stop same when opened, one of said micro-switches being mounted on said pot with the switch operator thereof being positioned to be engaged by said switch operator means when said cover is at its uppermost position to open said switch and stop said motor, the other of said micro-switches being mounted on one of said gear boxes and having the switch operator thereof positioned to be engaged by said switch operator means when said cover is at the lowermost position to open said switch to stop said motor, air compressor means, an air conduit operatively connecting the outlet of said air compressor means to the interior of said pot to pressurize same when said pot cover is in the closed position, a vent connected in one end portion to said upper portion of said pot and in fluid communication with the interior of said pot, a magnetic relief valve operatively connected to the other end portion of said vent, safety valve means operatively connected to said other end portion of said vent and operable to open at a predetermined pressure in said pot to discharge exhaust gases therefrom, pressure operated switch means mounted on said pot and having a pressure sensing element positioned within said pot, said pressure operated switch means having two sets of electrical contacts therein movable in response to pressure in said pot from a closed position at substantially atmospheric pressure to an open position at cooking pressure in said pot, a timer switch electrically connected to receive electricity, said timer switch having two fixed electrical contacts and a clock operated movable contact electrically engageable with said fixed contacts to provide electricity thereto, one of said fixed contacts of said timer switch being electrically connected in series to said other of said micro-switches, said electric motor and said inlet socket to complete an electrcal circuit and provide current to said motor to cause lowering of said cover when said other of said micro-switches is closed, a second electrical circuit in parallel to said last-named circuit connecting said one of said fixed contacts of said timer switch in series with said compressor and one of said electrical contacts in said pressure operated switch means and said inlet socket to commence operation of said compressor means until said pressure operated switch is opened as a result of increase of pressure in said pot, the other of said fixed contacts of said timer switch being electrically connected in series to said magnetic relief valve and to said inlet socket to complete a third electrical circuit and open said magnetic relief valve and exhaust said gases from said pot to reduce pressure therein, a fourth electrical circuit in parallel to said third electrical circuit and connecting in series said other of said fixed contacts of said timer swtich, said one of said micro-switches, the other of said contacts in said pressure operated switch means, said electric motor and said inlet socket to operate said motor to raise said cover when said one of said micro-switches and said other of said contacts in said pressure operated switch means are closed, said pressure cooker being constructed and adapted to receive a cooking liquid in said pot with such being heated by said electric and gas operated heating means with food being received in said basket and lowered into said cooking liquid as said cover is lowered by operation of said motor, said compressor means being operated to pressurize said pot to the desired cooking pressure with the pressure in said pot operating said pressure operated switch means to stop said compressor means at a predetermined pressure in said pot, said timer switch operable after a predetermined time interval to open said magnetic relief valve and exhaust gases from said pot through said vent means and thereby close said contacts in said pressure operated switch to permit passage of electric current therethrough and through said one of said micro-switches to said electric motor to operate same to raise said cover and said basket means carried by said cover.

3. An automatic deep fat pressure cooker comprising, in combination, a housing, an instrument panel, said housing having an opening therein, a hollow pot positioned in said housing and having the upper edge portion thereof positioned at said opening in said housing, a plurality of electrical heating elements positioned in said lower portion of said pot and having end portions thereof sealingly projecting through said pot, each of said heating elements being electrically connected to a thermostat and to a source of electric power, a heat sensing member electrically connected to said thermostat and positioned within said pot to sense the temperature therein to operate said thermostat, two elongated gas heating pipes having intermediate portions thereof positioned in said lower portion of said pot adjacent said electric heating elements and having the end portions thereof sealingly projecting through said pot, each of said pipes having a plurality of baffles therein extending transversely across said intermediate portions thereof, a primary fuel gas conduit connectible in one end portion to a supply of combustible fuel gas under pressure, two nozzles connected to said gas conduit, each of said nozzles being postioned adjacent and in spaced relation to said inlet ends of said heating pipes, a thermostat operated valve in said gas conduit upstream from said nozzles and operable to open and close said conduit to the passage of gas in response to the temperature in said pot, a pilot light nozzle positioned at said inlet ends of said heating pipes between said first-named nozzles and said heating pipes, a thermocouple, said inlet end of one of said heating pipes having said thermocouple mounted thereon adjacent said pilot light nozzle, a safety valve in said primary gas conduit upstream of said pilot light conduit, said safety valve being operatively connected to said thermocouple and operable to close said primary conduit when said thermocouple is cooled as a result of extinguishing the flames of said first-named nozzles and said pilot light nozzle at said inlet ends of said heating pipes, two pot support tubes each having the lower end portion thereof connected to said housing and each having the upper end portion thereof connected to the bottom of said pot, a generally circular cover for said pot, three elongated bars each mounted in one end portion on the inner surface of said cover and received by said pot when said cover is in the closed position, and the other end portion of each of said bars being bent radially inwardly toward the center of said pot, baskets for food and the like, an annular sealing ring mounted on said upper edge portion of said pot and positioned thereon to sealingly engage said cover when in the lowermost position, a rod mounted in one end portion on the center of said cover, the other end portion of said rod projecting through said bottom of pot and slidable therethrough, an annular seal mounted in said bottom of said pot and sealingly engaging said rod, two spaced mounting flanges mounted on the lower surface of said bottom of said pot and positioned on opposite sides of said rod, a first pair of two operating arms each pivotally mounted in one end portion on said flanges and positioned on opposite sides of said rod, a second pair of operating arms positioned on opposite sides of said rod and each pivotally connected in one end portion to the other end portions of said first pair of arms, the other end portion of each of said second pair of arms being pivotally connected to said other end portion of said rod, each of said second pair of arms having an integral mounting portion at said other end portion thereof projecting therefrom in mirror image relation, a mounting bracket secured to an intermediate portion of one side of said housing, an air cylinder pivotally connected in one end portion to said mounting bracket and having a piston rod slidably projecting from the other end portion thereof with the outermost end of said piston rod being operatively connected to said mounting portions of said second pair of arms so that operation of said air cylinder to extend and retract said piston rod causes movement of said pairs of arms from a longitudinally aligned position to a position at an angle to each other and movement of said rod through said pot to raise and lower said cover, an air storage tank, an air compressor mounted on said air storage tank, a conduit connected in the end portion to the outlet of said air storage tank and to said upper portion of said pot to pressurize said pot when said cover is closed, a valve in said another air conduit operable to open and close said conduit to the passage of air, an electrically operated four-way air valve having the inlet thereof operatively connected to said outlet of said air storage tank to receive air therefrom, a flexible conduit connecting one outlet of said four-way air valve to said one end portion of said air cylinder, another flexible conduit connecting a second outlet of said four-way air valve to said other end portion of said air cylinder, a third outlet of said four-way air valve opening to the atmosphere to exhaust air therefrom, an L-shaped vent connected in one end portion to said upper portion of said rear portion of said pot and in fluid communication with the interior of said pot, said vent having two outlet openings at the other end portion thereof, a magnetic relief valve operatively connected to one of said outlet openings of said vent, a T-shaped coupling having three openings with one of said openings being operatively connected to the other of said openings at said other end portion of said vent, a safety valve operatively connected to another opening of said coupling and operable to open at approximately 20 pounds per square inch pressure to pass gases from said pot therethrough, a pipe connected in the end portion to said last-named safety valve and to an intermediate portion of said exhaust pipe, another safety valve connected to the other opening of said coupling and operable to open at approximately 30 pounds per square inch pressure to pass gases from said pot therethrough, another pipe connected in the end portions to said last-named safety valve and to an intermediate portion of said last-named pipe, a timer switch mounted on said instrument panel connected to receive electricity, said timer switch having two fixed electrical contacts and a clock operated movable contact electrically engageable with said fixed contacts to provide electricity thereto, one of said fixed contacts of said timer switch being electrically connected in series to said four-way air valve and said inlet socket to complete an electrical circuit and provide current to said air valve to cause same to direct air to said one end portion of said air cylinder and lower said cover, the other of said fixed contacts of said timer switch being connected in series to said magnetic relief valve and to said inlet socket to complete a second electrical circuit and open said magnetic relief valve and exhaust gases from said pot to reduce pressure therein, a time delay relay switch electrically connected to said magnetic relief valve and to said air valve to operate said air valve a predetremined time interval after operation of said magnetic relief valve to operate said air valve and direct air to said other end portion of said air cylinder to raise said cover, said pressure cooker being constructed and adapted to receive a cooking liquid in said pot with such being heated by said electric heating elements and said heating pipes in said pot, food or the like received in said baskets being lowered into said cooking liquid as said cover is lowered, said compressor being operated to pressurize said pot to approximately 18 pounds per square inch, said movable contact of said timer switch being moved after a preset time interval into electrical contact with said other of said fixed contacts to open said magnetic relief valve and exhaust gases from said pot through said vent and said exhaust pipe to the atmosphere, said time delay relay switch providing electric current to said air valve a predetermined time interval after opening of said magnetic relief valve to operate said air valve to provide air to said other end portion of said air cylinder to raise said cover and said basket carried by said cover.

4. An automatic pressure cooker comprising, in combination, a housing having a top, an opening therein, a hollow pot positioned in said housing and having the upper edge portion hereof positioned at said opening, heating means positioned in the lower portion of said pot, and operable to heat same and cooking fluid therein, a cover for said pot, basket support means connected to said cover and positionable within said pot when said cover is in the closed position, basket means mountable on said basket support means and positionable within said pot when said cover is in the closed position, a rod connected to said cover in one end portion and slidably projecting through the bottom of said pot, sealing means connected to said pot and sealingly engaging said rod, a first pair of arms pivotally mounted on said bottom of said pot and positioned adjacent said rod, a second pair of arms pivotally mounted in one end portion on the other end portion of said first-named arms and pivotally connected in the other end portion to the other end portion of said rod, an air cylinder operatively connected in one end portion to said housing and having a piston rod projecting from the other end portion thereof, the outermost end of said piston rod being pivotally connected to said other end portion of said last-named pair of arms so that extension and retraction of said piston rod in said air cylinder causes movement of said arms and said rod connected thereto to thereby raise and lower said cover, an air storage tank, an air compressor operatively connected to said air storage tank to provide air under pressure thereto, an air conduit connected in one end portion to the outlet of said air storage tank and to said upper portion of said pot to pressurize said pot when said cover is closed, an electrically operated four-way air valve having the inlet thereof operatively connected to said outlet of said air storage tank and having one outlet thereof openable to the atmosphere, a flexible conduit connecting another outlet of said four-way air valve to said one end portion of said air cylinder to provide air thereto, a further flexible conduit connecting another outlet of said four-way air valve to said other end portion of said air cylinder to provide air under pressure thereto, a vent connected in one end portion to said upper portion of said pot and in fluid communication with the interior thereof, a magnetic relief valve operatively connected to the other end portion of said vent and operable when open to pass exhaust gases from said pot therethrough, safety valve means connected to said other end portion of said vent and operable to open on a predetermined pressure in said pot, a timer switch mounted on said housing and electrically connectible to a source of electricity, said timer switch having two fixed electrical contacts and a clock operated movable contact electrically engageable with said fixed contacts to provide electricity thereto, one of said fixed contacts of said timer switch being electrically connected in series to said four-way air valve to provide current to said air valve to cause same to direct air to said one end portion of said air cylinder and lower said cover, the other of said fixed contacts of said timer switch being connected in series to said magnetic relief valve to open same and exhaust gases from said pot to reduce pressure therein, a time delay relay switch electrically connected in series to said magnetic relief valve and to said air valve to operate said air valve a predetermined time interval after operation of said magnetic relief valve to provide air under pressure to said other end portion of said air cylinder to raise said cover, said pressure cooker being constructed and adapted to receive a cooking liquid in said pot with such being heated by said heating means and with food or the like being received in said basket means being lowered into said cooking liquid as said cover is lowered, said pot being pressurized by air under pressure from said air storage tank during cooking operations, said timer switch operable after a predetermined time to provide electric current to said magnetic relief valve to discharge gases from said pot with said time delay relay switch subsequently closing to provide electric current to said air valve to raise said cover and lift said basket means with said food therein from said cooking liquid in said pot.

5. A pressure cooker comprising, in combination, a housing, a hollow pot for containing a cooking liquid mounted in said housing, heating means operatively connected to said pot to heat cooking liquid when contained therein, a cover for said pot, rod means connected in one end portion to said cover and slidably and sealingly passing through the lower portion of said pot, an air cylinder operatively connected in one end portion to said housing and having a piston rod projecting from the other end portion thereof, linking means connected to said piston rod of said air cylinder and to the other end portion of said rod so that extension and retraction of said piston rod lowers and raises said cover means on said cover for supporting food to be cooked in cooking liquid in said pot, means in said housing operatively connected to said pot to provide a gas under pressure thereto, said last-named means being operatively connected to said air cylinder to provide air under pressure thereto to extend and retract said piston rod, vent means connected in one end portion to said pot and in fluid communication with the interior thereof, electrically operated relief valve means connected to said vent means and operable to open same to discharge gases from said pot, switch means connectible to a source of electrical power and to said relief valve means and operable to open and close same to the passage of gases therethrough, said cooker being constructed and adapted to receive and heat a cooking liquid in said pot so that food positioned therein can be cooked under pressure when said cover is closed with said switch means opening said valve means to reduce pressure in said pot prior to opening of said cover.

6. An automatic deep fat pressure cooker comprising, in combination, a housing, an instrument panel, said housing having a top opening therein, a hollow pot positioned in said housing and having the upper edge portion thereof positioned at said opening in said housing, a plurality of electrical heating elements positioned in the lower portion of said pot and having end portions thereof sealingly projecting through said pot, each of said heating elements being electrically connected to a thermostat and to a source of electric power, a heat sensing member electrically connected to said thermostat and positioned within said pot to sense the temperature therein to operate said thermostat, two elongated gas heating pipes having intermediate portions thereof positioned in said lower portion of said pot adjacent said electric heating elements and having the end portions thereof sealingly projecting through said pot, each of said pipes having a plurality of baffles therein extending transversely across said intermediate portions thereof, a primary fuel gas conduit connectible in one end portion to a supply of combustible fuel gas under pressure, two nozzles connected to said gas conduit, each of said nozzles being positioned adjacent and in spaced relation to said inlet ends of said heating pipes, a thermostat operated valve in said gas conduit upstream from said nozzles and operable to open and close said conduit to the passage of gas in response to the temperature in said pot, a pilot light nozzle positioned at said inlet ends of said heating pipes between said first-named nozzles and said heating pipes, a flue header connected in fluid communication to the exhaust end portion of both of said heater pipes to receive exhaust gases therefrom, a cover for said pot, three elongated bars mounted on the inner surface of said cover and received by said pot when said cover is in the closed position, the end portion of each of said bars being bent radially inwardly toward the center of said pot, basket means for food and the like positioned on said bars, an annular sealing ring mounted on said upper edge portion of said pot and positioned thereon to sealingly engage said cover when in the closed position, rod means mounted in one end portion on said cover and having the other end portion thereof positioned adjacent said lower portion of said pot, power means operatively connected to said other end portion of said rod means and operable to raise and lower same and said cover attached thereto, an air compressor having the outlet operatively connected to said pot to provide air under pressure thereto, a vent connected in one end portion to said upper portion of said rear portion of said pot and in fluid communication with the interior of said pot, said vent having two outlet openings at the other end portion thereof, a magnetic relief valve operatively connected to one of said outlet openings of said vent, an exhaust pipe connected in one end portion to said magnetic relief valve with the other end portion opening to the atmosphere and with gases from said pot being discharged through said vent and said exhaust pipe to the atmosphere when said relief valve is open, a T-shaped coupling having three openings with one of said openings being operatively connected to the other of said openings at said other end portion of said vent, a safety valve operatively connected to another opening of said coupling and operable to open at approximately 20 pounds per square inch pressure to pass gases from said pot therethrough, a pipe connected in the end portions to said last-named safety valve and to an intermediate portion of said exhaust pipe, another safety valve connected to the other opening of said coupling and operable to open at approximately 30 pounds per square inch pressure to pass gases from said pot therethrough, another pipe connected in the end portions to said last-named safety valve and to an intermediate portion of said last-named pipe, a timer switch mounted on said instrument panel and electrically connected to receive electricity, said timer switch having two fixed electric contacts and a clock operated movable contact electrically engageable with said fixed contacts to provide electricity thereto, one of said fixed contacts of said timer switch being electrically connected in series to said magnetic relief valve and to said inlet socket to complete an electrical circuit and open said magnetic relief valve and exhaust gases from said pot to reduce pressure therein at the end of a cooking cycle, the other of said fixed contacts of said timer switch being electrically connected to switch means to operate said power means to lower said cover, said other of said fixed contacts of said timer switch being electrically connected to said switch means to operate said power means to raise said cover, said pressure cooker being constructed and adapted to receive a cooking liquid in said pot with such being heated by said electrical heating elements and said heating pipes and said pot, food or the like received in said basket being lowered into said cooking liquid as said cover is lowered by said power means with said compressor being operated when said cover is lowered to pressurize said pot, said movable contact of said timer switch being moved at a preset time interval into position to open said magnetic relief valve and exhaust gases from said pot through said vent and said exhaust pipe to the atmosphere with said power means being subsequently operated to raise said cover and said basket means carried thereby.

7. A pressure cooker comprising, in combination, a hollow pot for containing cooking liquid, heating means operatively connected to said pot to heat cooking liquid when contained in same, a cover movably mounted on said pot, connecting means operatively connected in one end portion to said cover, motor means operatively connected to said connecting means to move same to raise and lower said cover, means mounted on said cover for supporting food to be cooked in cooking liquid in said pot, vent means connected in one end portion to said pot and in fluid communication with the interior thereof, relief valve means connected to said vent means and operable when said valve means is open to substantially equalize pressure between the interior of said pot and the atmosphere, said pressure cooker being constructed and adapted to receive and heat a cooking liquid in said pot so that food positioned therein can be cooked under pressure when said cover is closed.

8. A pressure cooker comprising, in combination, a housing, a hollow pot for containing a cooking liquid mounted in said housing, heating means operatively connected to said pot to heat cooking liquid when contained therein, a cover for said pot, means connected to said cover supporting same for upward movement, a power means operatively connected to said means connected to said cover for moving said cover to open and closed engagement with said pot, means on said cover for supporting food to be cooked in cooking fluid in said pot, means in said housing operatively connected to said pot to provide gas under pressure thereto, vent means connected in one end portion to said pot and in fluid communication with the interior thereof, electrically operated relief valve means connected to said vent means and operable to open same to discharge gases from said pot, switch means connectible to a source of electric power and to said relief valve means and operable to open and close same to the passage of gases therethrough, said cooker being constructed and adapted to receive and heat a cooking fluid in said pot so that food positioned therein can be cooked under pressure when said cover is closed with said switch means opening said valve means to reduce pressure in the pot prior to opening of said cover.

9. The pressure cooker of claim 8 wherein there is provided a safety means for controlling opening of said cover for said pot comprising, a pressure operated switch means sensitive to pressure within said pot, and circuit means operably connected to said pressure operated switch and said power means for moving said cover, said pressure means in said circuit means constructed and adapted to permit actuation of said power means only after pressure in said pot has dropped to a value substantially equal to atmospheric pressure.

References Cited by the Examiner
UNITED STATES PATENTS

| | | | |
|---|---|---|---|
| 1,982,301 | 11/34 | Harvey | 268—59 |
| 2,537,695 | 1/51 | Page | 126—374 X |
| 2,649,341 | 8/53 | Stepler | 268—59 |
| 2,827,379 | 3/58 | Phelan. | |
| 2,849,944 | 9/58 | Pricket et al. | 99—330 |
| 2,914,063 | 11/59 | Wagner | 219—44 X |
| 2,942,753 | 6/60 | Kelton | 220—33 |

ROBERT E. PULFREY, *Primary Examiner.*

LAWRENCE CHARLES, *Examiner.*